United States Patent
Chen

(10) Patent No.: US 6,464,435 B1
(45) Date of Patent: Oct. 15, 2002

(54) MACHINE TOOL

(76) Inventor: Hsi-Kuan Chen, 13F-2, No. 92, Chung-Kung-Erh Rd., Hsi-Tun Dist., Taichung City (TW)

( * ) Notice: Subject to any disclaimer, the term of this patent is extended or adjusted under 35 U.S.C. 154(b) by 0 days.

(21) Appl. No.: 09/658,055

(22) Filed: Sep. 8, 2000

(51) Int. Cl.[7] ............................. B23C 9/00; F16C 13/00
(52) U.S. Cl. ....................... 409/231; 184/6.14; 384/517; 384/519; 384/583
(58) Field of Search .................................. 409/231, 232, 409/233, 234; 384/517, 518, 519, 616, 905; 184/6.14; 354/479, 558, 557, 583

(56) References Cited

U.S. PATENT DOCUMENTS

| | | | |
|---|---|---|---|
| 3,649,051 A | * | 3/1972 | Jones et al. |
| 3,804,477 A | * | 4/1974 | Allmandinger et al. |
| 4,514,123 A | * | 4/1985 | Johnstone et al. ........... 409/231 |
| 4,519,734 A | * | 5/1985 | Mitchell et al. ............. 409/231 |
| 4,611,934 A | * | 9/1986 | Piotrowski et al. .......... 384/517 |
| 4,657,412 A | * | 4/1987 | McCarty et al. ........ 384/517 X |
| 5,094,551 A | * | 3/1992 | Kitamura et al. ............ 384/518 |
| 5,388,917 A | * | 2/1995 | Hibi et al. ................... 384/517 |
| 5,848,845 A | * | 12/1998 | Jeng et al. ................... 384/466 |
| 6,042,273 A | * | 3/2000 | Thrasher ................. 384/519 X |

FOREIGN PATENT DOCUMENTS

| | | | |
|---|---|---|---|
| EP | 0474902 A1 | * 3/1992 | ................. 384/583 |
| JP | 403196903 | * 8/1991 | ................. 409/231 |
| JP | 8-85006 | * 4/1996 | ................. 409/231 |

* cited by examiner

*Primary Examiner*—William Briggs
(74) *Attorney, Agent, or Firm*—Sheridan Ross PC

(57) ABSTRACT

A machine tool includes a tool spindle rotatably mounted in a housing. A tool member is disposed in a front spindle segment of the spindle and is releasably clamped by a clamping member. An actuating member is mounted in and is axially movable relative to the spindle to actuate the clamping member. First and second anti-friction bearings are interposed between the housing and the spindle and have different outer diameters. A preload actuating member is disposed to force the second anti-friction bearing in the axial direction to take up the slack in a non-actuated state of the second anti-friction bearing when the spindle is running in a higher speed, thereby resuming the anti-friction function of the second anti-friction bearing when running the tool spindle at a lower speed is intended.

10 Claims, 9 Drawing Sheets

MACHINE TOOL

BACKGROUND OF THE INVENTION

1. Field of the Invention

This invention relates to a machine tool, more particularly to a spindle head of a machine tool, such as a CNC machine tool, which permits adjustment of the preload applied to an anti-friction bearing so as to suit the rotation speed of a tool spindle.

2. Description of the Related Art

A conventional spindle head of a machine tool includes a tool spindle mounted rotatably in a housing. A tool member is connected to a front end of the tool spindle by a four-jaw chuck. An actuating rod is mounted in the tool spindle to actuate the chuck to clamp or release the tool member when the actuating rod is moved axially relative to the tool spindle. A spindle bearing assembly is interposed between the tool spindle and the housing, and includes front, intermediate, and rear anti-friction bearings for facilitating the rotation of the tool spindle relative to the housing. In this construction, the preload applied on the bearings is constant, thereby resulting in insufficient rigidity when the tool spindle is running at a lower rotation speed.

To solve this problem, another conventional spindle head of a machine tool has been developed to include a preload actuating member which includes a force transmitting member mounted between the housing and the front anti-friction bearing, and front and rear inlets disposed forwardly and rearwardly of the actuating member. As such, when a lower speed of the tool spindle is intended, hydraulic liquid can be introduced from the rear inlet so as to move the force transmitting member forwardly to force the front anti-friction bearing axially, thereby increasing the rigidity of the front anti-friction bearing. When the tool spindle is running at a higher rotation speed, another hydraulic liquid can be introduced from the front inlet so as to move the force transmitting member backwards to reduce the preload applied on the front anti-friction bearing. Therefore, by means of the movement of the force transmitting member relative to the front anti-friction bearing, the preload on the bearing can be adjusted. Moreover, the amounts of the inlets can be increased to adjust the preload to different levels.

However, since the diameters of the bearings are the same, the circumferential speed of the spindle bearing assembly, that is related to the pitch diameter of the bearing and the rotating speed of the tool spindle, is increased when the tool spindle is running at a higher rotation speed, thereby resulting in overheating of the bearing and eventual reduction in the service life of the same.

SUMMARY OF THE INVENTION

The object of the present invention is to provide a machine tool in which two anti-friction bearings of different diameters are selectable for use on a tool spindle so as to suit for the rotation speed of the tool spindle.

According to this invention, the machine tool includes a housing which has an annular inner wall extending in an axial direction. The annular inner wall includes a front annular inner wall segment, an intermediate annular inner wall segment which has a diameter smaller than that of the front annular inner wall segment, and an annular shoulder portion which is interposed between the front and intermediate annular inner wall segments and which extends in a radial direction relative to the axial direction. A tool spindle is mounted in and is rotatable relative to the annular inner wall, and includes a front spindle segment which is radially spaced apart from the front annular inner wall segment, an intermediate spindle segment which is radially spaced apart from the intermediate annular inner wall segment and which has a diameter smaller than that of the front spindle segment, and a rear spindle segment at the opposite side of the intermediate spindle segment relative to the front spindle segment. A tool member has a clamped portion which is disposed in the front spindle segment and which is releasably clamped by a clamping member, and a free tool portion which extends from the clamped portion axially and outwardly of the front spindle segment. An actuating member is mounted in and is axially movable relative to the tool spindle, and includes a front actuating end which is disposed in the front spindle segment to actuate the clamping member to clamp or release the clamped portion of the tool member when the actuating member is moved axially relative to the tool spindle, and a rear actuated end which extends from the front actuating end in the axial direction and rearwardly and outwardly of the rear spindle segment so as to permit external operation of the axial movement of the actuating member. A first anti-friction bearing is interposed between the intermediate annular inner wall segment and the intermediate spindle segment, and has a first outer diameter sufficient to facilitate rotation of the intermediate spindle segment relative to the intermediate annular inner wall segment. A second anti-friction bearing is interposed between the front annular inner wall segment and the front spindle segment, and has a second outer diameter larger than the first outer diameter of the first anti-friction bearing and sufficient to facilitate rotation of the front spindle segment relative to the front annular inner wall segment. A preload actuating member is disposed to force the second anti-friction bearing in the axial direction to take up the slack in a non-actuated state of the second anti-friction bearing when the tool spindle is running at a higherspeed, thereby resuming the anti-friction function of the second anti-friction bearing when running of the tool spindle at a lower speed is intended.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
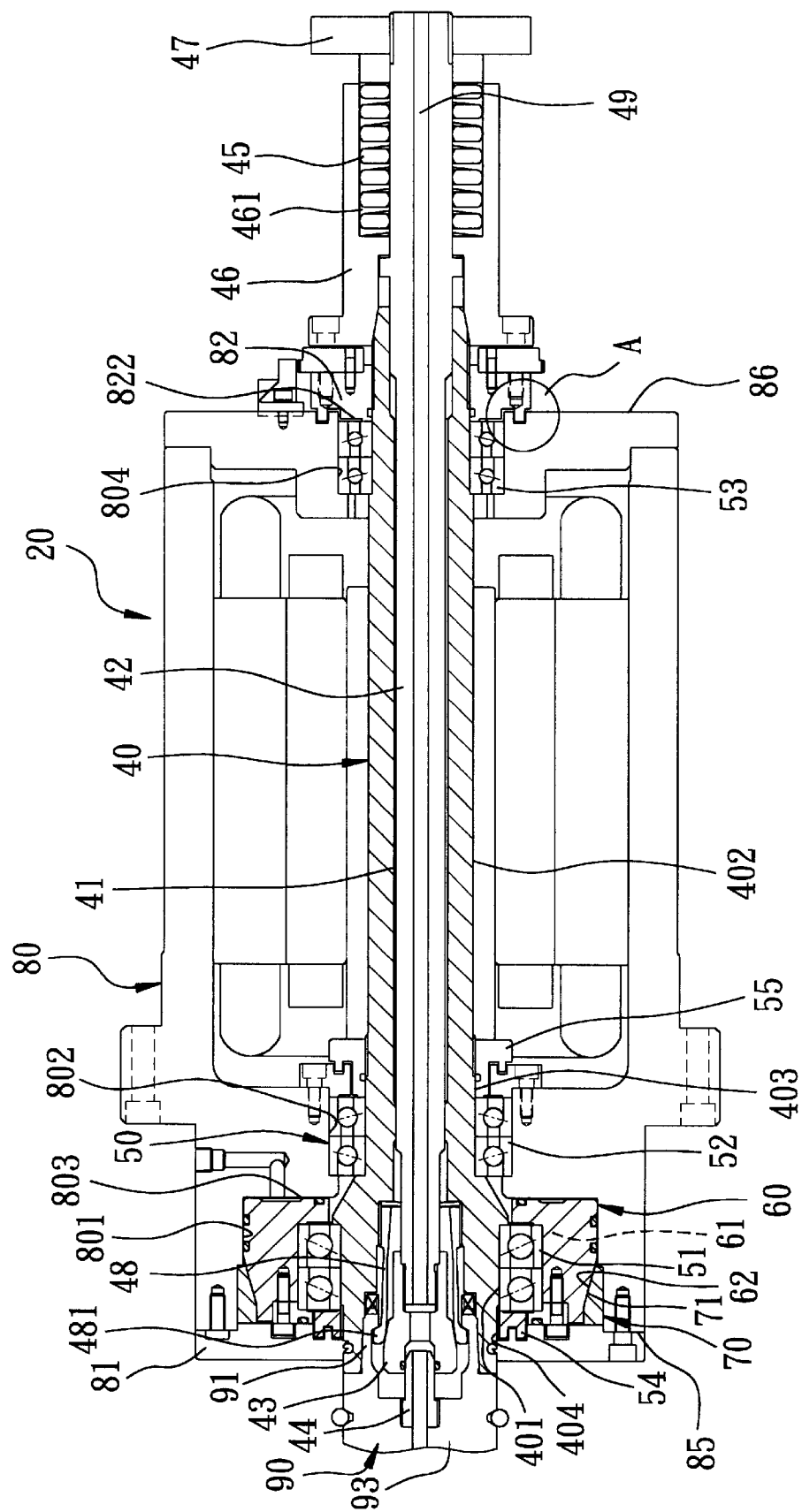
FIG. 1 is a sectional view of a first preferred embodiment of a spindle head portion of a machine tool according to this invention.

Before the present invention is described in greater detail, it should be noted that same reference numerals have been used to denote like elements throughout the specification.

Referring to FIG. 1, the first preferred embodiment of the machine tool according to the present invention is shown to comprise a spindle head portion 20 which includes a housing 80 with an annular inner wall extending in an axial direction. The annular inner wall includes a front annular inner wall segment 801 with a first diameter, an intermediate annular inner wall segment 802 with a second diameter which is smaller than the first diameter of the front annular inner wall segment 801, an annular shoulder portion 803 which is interposed between the front and intermediate annular inner wall segments 801, 802 and which extends in a radial direction relative to the axial direction, and a rear annular inner wall segment 804 which is disposed at the opposite side of the intermediate annular inner wall segment 802 relative to the front annular inner wall segment 801. The housing 80 further includes a front end wall 85 which extends in a direction transverse to the axial direction and which is opposed to the annular shoulder portion 803, and a rear end wall 86 which extends in the transverse direction and rearwardly of the rear annular inner wall segment 804. Annular front and rear positioning members 81, 82 are secured to the front and rear end walls 85, 86, respectively.

A tool spindle 40 is mounted in and is rotatable relative to the annular inner wall of the housing 80. The tool spindle 40 includes a front spindle segment 401 which has a third diameter and which is disposed to be radially spaced apart from the front annular inner wall segment 801, an intermediate spindle segment 403 which has a fourth diameter that is smaller than the third diameter of the front spindle segment 401 and which is disposed to be radially spaced apart from the intermediate annular inner wall segment 802, and a rear spindle segment 402 at the opposite side of the intermediate spindle segment 403 relative to the front spindle segment 401. The tool spindle 40 further has an axial hole 41 which extends in the axial direction. The axial hole 41 includes a front portion which corresponds to the front annular inner wall segment 801, and a rear smaller portion which corresponds to the intermediate and rear annular inner wall segments 802, 804.

A tool member 90 has a clamped portion 91 which is disposed in the front portion of the axial hole 41, and a free tool portion 93 which extends from the clamped portion 91 axially and outwardly of the front spindle segment 401.

Figure 3:
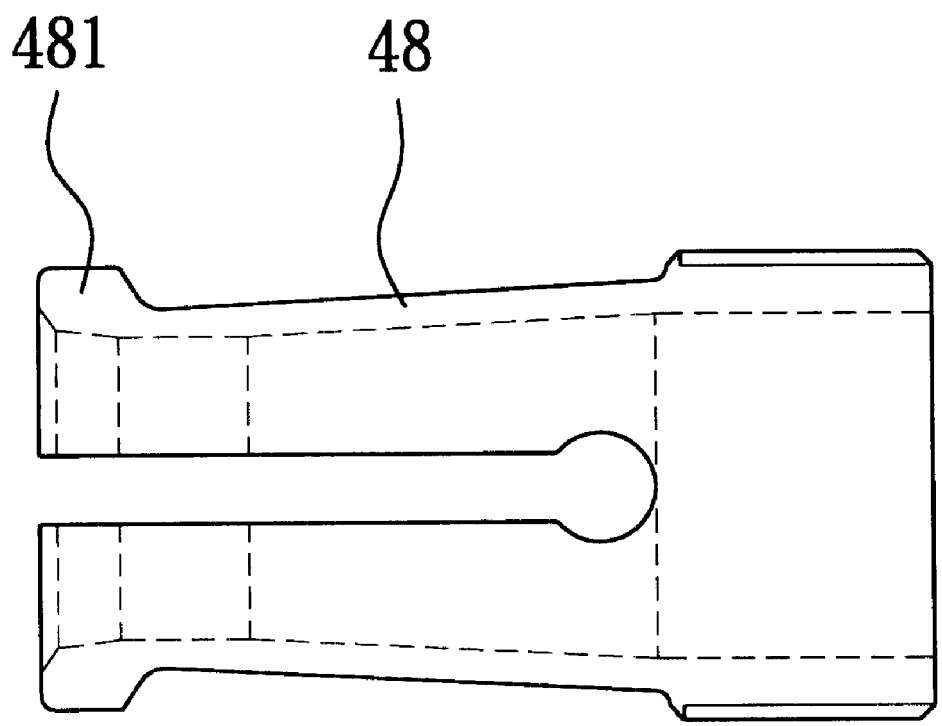
FIG. 3 is a schematic view of a clamping member of the first preferred embodiment.

A clamping member, such as a four-jawed chuck 48, is disposed in the front portion of the axial hole 41. With reference to FIG. 3, in this embodiment, the four-jawed chuck 48 has an integrally formed structure, and includes four enlarged end portions 481 to clamp or release the clamped portion 91 of the tool member 90.

An actuating member 42 is mounted in and extends along the axial hole 41, and is axially movable relative to the tool spindle 40. The actuating member 42 includes a front actuating end 43 which is disposed in the front spindle segment 401. A coolant supply set 44 is mounted on the front actuating end 43 in a known manner. The actuating member 42 further includes a rear actuated end 49 which extends from the front actuating end 43 in the axial direction and rearwardly and outwardly of the rear spindle segment 402 of the tool spindle 40 to form an actuated head 47 so as to permit external operation of the axial movement of the actuating member 42. An annular sleeve seat 46 is secured on and extends rearwardly of the rear positioning member 82, and is spaced apart from the actuated head 47 in the axial direction. The sleeve seat 46 is further spaced radially apart from the rear actuated end 49 of the actuating member 42 to confine an annular recess 461. A compression spring 45 is mounted in the recess 461 and extends in the axial direction so as to bias the actuated head 47 away from the sleeve seat 46. As such, the actuating member 42 is moved rearwardly relative to the tool spindle 40, and the enlarged end portions 481 of the four-jawed chuck 48 can be actuated to clamp the clamped portion 91 of the tool member 90.

A spindle bearing assembly 50 includes a first anti-friction bearing 52, a second anti-friction bearing 51, and a third bearing 53 which are mounted on the tool spindle 40.

The first anti-friction bearing 52 is interposed between the intermediate annular inner wall segment 802 and the intermediate spindle segment 403, and has a first outer diameter sufficient to facilitate rotation of the intermediate spindle segment 403 relative to the intermediate annular inner wall segment 802. A retaining ring 55 is secured on the tool spindle 40 to retain and abut against a rear end of the first anti-friction bearing 52 in place.

The second anti-friction bearing 51 is interposed between the front annular inner wall segment 801 and the front spindle segment 401, and has a second outer diameter larger than the first outer diameter of the first anti-friction bearing 52 and sufficient to facilitate rotation of the front spindle segment 401 relative to the front annular inner wall segment 801. A retaining member 54 is secured on the tool spindle 40 to retain and abut against a front end of the second anti-friction bearing 51. The second anti-friction bearing 51 is radially spaced apart from the front annular inner wall segment 801, and is axially spaced apart from the annular shoulder portion 803 so as to define a cylindrical space 61.

Figure 2:
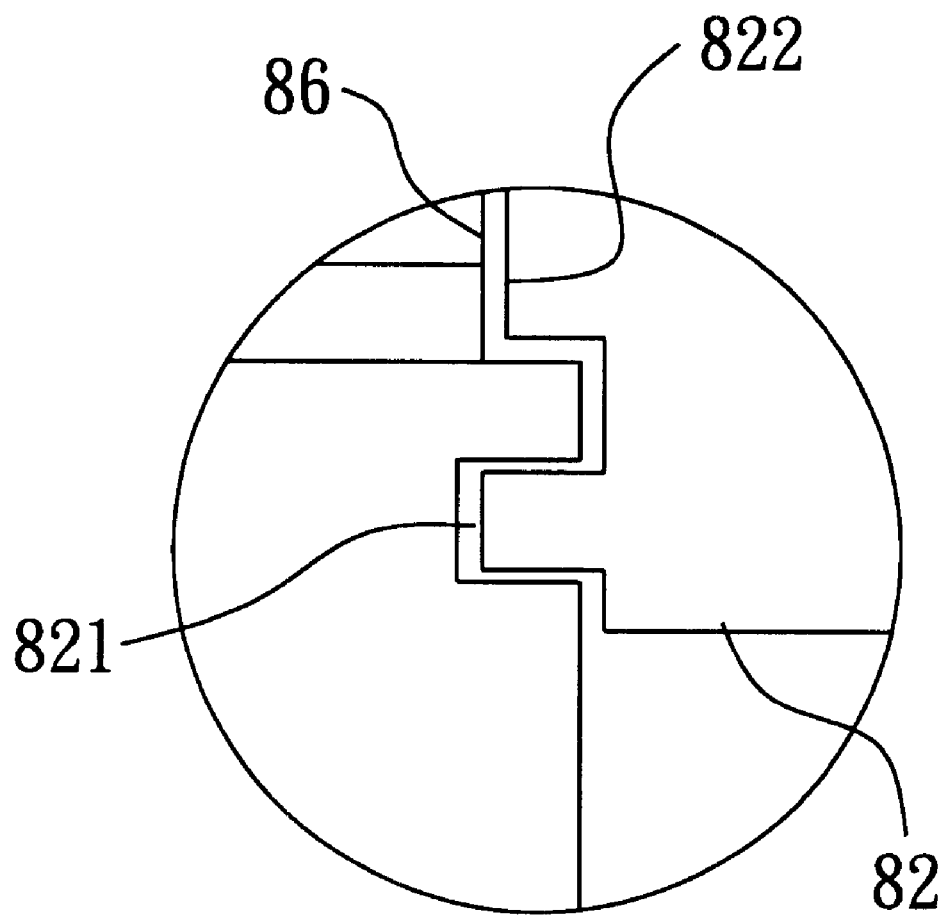
FIG. 2 is an enlarged view of an encircled portion (A) in FIG. 1.

The rear annular inner wall segment 804 of the housing 80 is radially spaced apart from the rear spindle segment 402 to define a bearing accommodating space therebetween. The third bearing 53 is received in the bearing accommodating space, and is loosely mounted on the rear spindle segment 402 so as to permit adjustment of a position of the third bearing 53 relative to the rear spindle segment 402 in the axial direction. In particular, the annular rear positioning member 82 includes an insert portion 822 which extends towards the third bearing 53 and which is inserted in the bearing accommodating space so as to retain the third bearing 53 in the bearing accommodating space. With reference to FIG. 2, the annular rear positioning member 82 is further spaced apart from the rear end wall 86 in the axial direction to define a clearance 821 therebetween for accommodating an increment of length caused by possible thermal expansion of the tool spindle 40.

A preload actuating member includes a force transmitting member 60 that is disposed in the cylindrical space 61, and that sealingly abuts against the front annular inner wall segment 801. In particular, the force transmitting member 60 extends forwardly and is interposed between the front annular inner wall segment 801 and the second anti-friction bearing 51 so as to provide a support for the second anti-friction bearing 51 in the radial direction. A resisting member includes a taper bore ring 70 which is disposed on the front annular inner wall segment 801 and which has an annular inclined wall 71 that is converged gradually and forwardly in the axial direction, and an annular front converged portion 62 that is formed on and that extends forwardly from the force transmitting member 60 and that is converged gradually and forwardly so as to matingly abut against the annular inclined wall 71.

Figure 4:
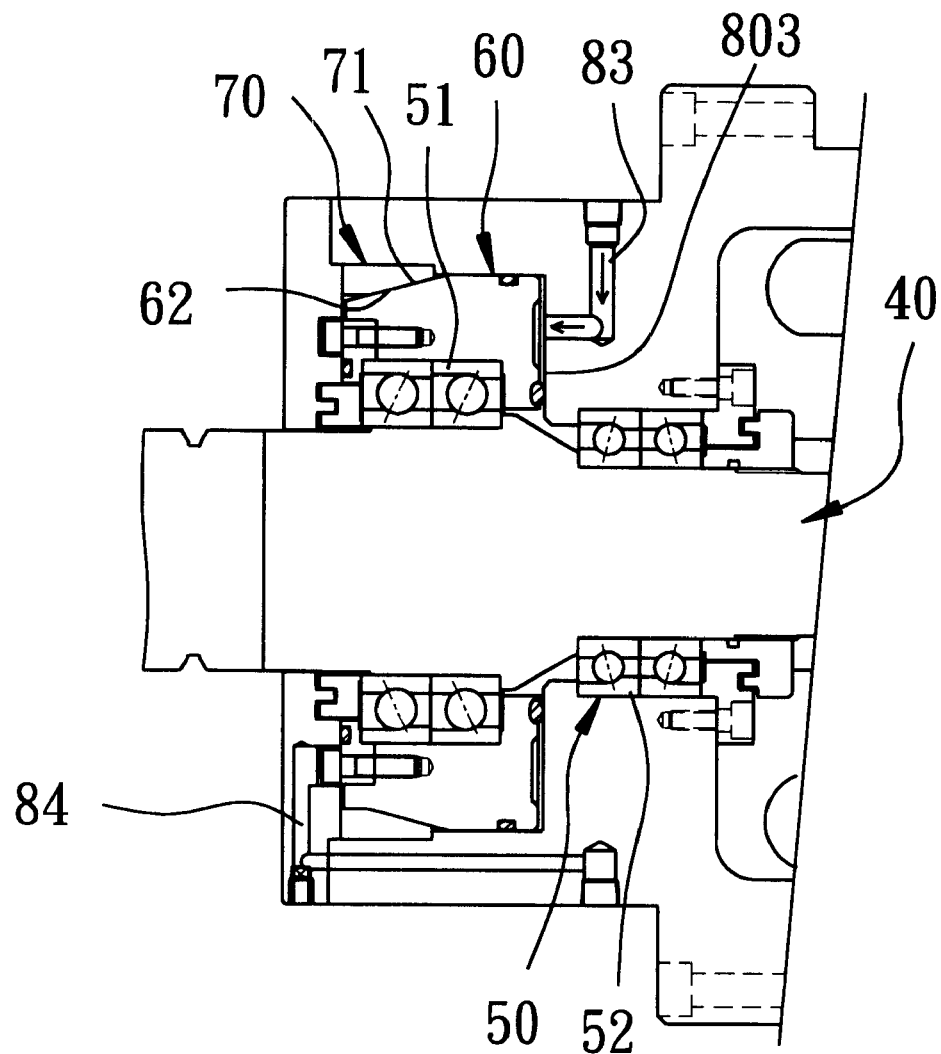
FIG. 4 is a schematic view showing a front portion of a spindle head of the first preferred embodiment when a tool spindle thereof is intended to run at a low rotation speed.

With reference to FIG. 4, front and rear inlets 84,83 are disposed in the front end wall 85 and the annular shoulder portion 803, respectively. When a lower speed of the tool spindle 40 is intended, hydraulic liquid can be introduced from the rear inlet 83 to the cylindrical space 61 so as to move the force transmitting member 60 forwardly to force the second anti-friction bearing 51 in the axial direction to take up the slack in a non-actuated state of the second anti-friction bearing 51 when the tool spindle 40 is running at a higher speed, thereby resuming the anti-friction function of the second anti-friction bearing 51. Therefore, the preload applied on the spindle bearing assembly 50 can be increased, thereby increasing the rigidity of the tool spindle 40. It is noted that the excess preload will be restricted by the abutment of the annular inclined wall 71 and the annular front converged portion 62.

Figure 6:
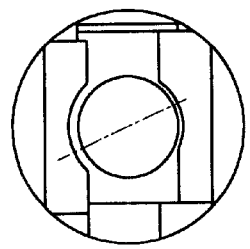
FIG. 6 is an enlarged view of an encircled portion (B) in FIG. 5.
Figure 5:
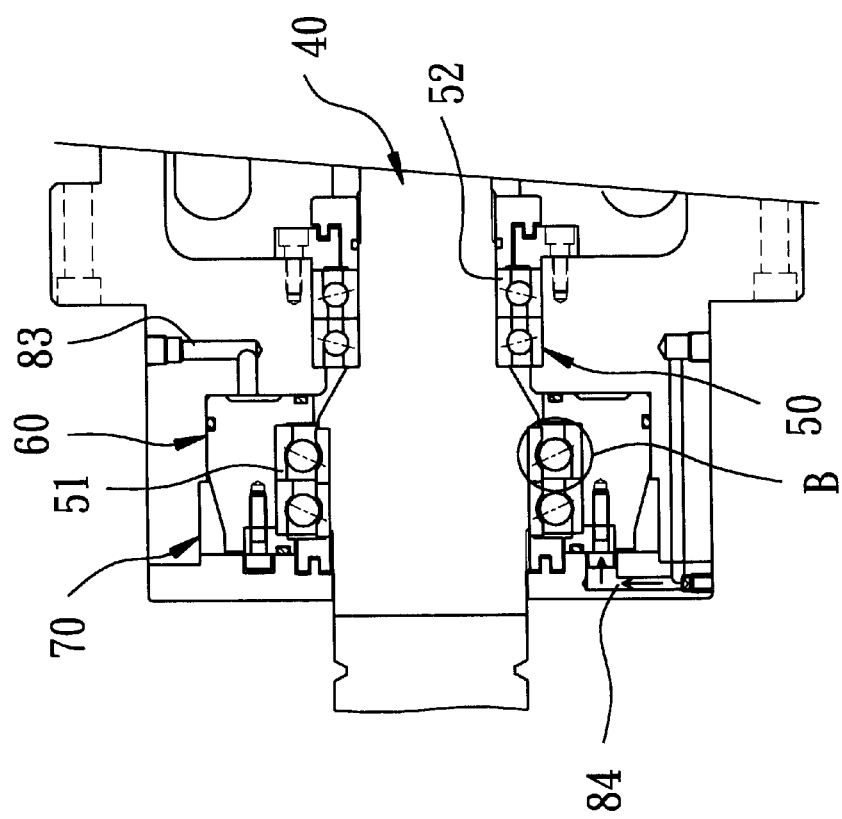
FIG. 5 is a schematic view showing the front portion of the spindle head of the first preferred embodiment when the tool spindle is intended to run at a high rotation speed.

With reference to FIGS. 5 and 6, when the tool spindle 40 is switched to run at a higher speed and the hydraulic liquid is drained out of the cylindrical space 61, by means of the annular inclined wall 71 and by introducing another hydraulic liquid from the front inlet 84, the force transmitting member 60 can be bounced backwards to relieve the second anti-friction bearing 51 from being forced by the force transmitting member 60. Balls in the second anti-friction bearing 51 are moved away from an inner ring thereof (as shown in FIG. 6) to be restored in the non-actuated state. At the same time, the first anti-friction bearing 52 is rotated with the tool spindle 40 with a preload applied thereon. Therefore, the circumferential speed of the spindle bearing assembly 50 is decreased, thereby preventing the second anti-friction bearing 51 from overheating during the higher rotating operation of the tool spindle 40.

As mentioned above, since the diameter of the first anti-friction bearing 52 is smaller than that of the second anti-friction bearing 51, and since the first and second anti-friction bearings 52,51 are switchable for use on a tool spindle during higher and lower rotation speeds of the tool spindle 40, the rigidity of the spindle bearing assembly 50 can be increased during the lower rotating operation of the tool spindle 40, and the service life of the second anti-friction bearing 51 can be prolonged during the higher rotating operation of the tool spindle 40.

Moreover, when the tool spindle 40 is running at a higher rotation speed, the integrally formed four-jawed chuck 48 can be prevented from being offset by a centrifugal force. Also, the compression spring 45 is received in the recess 461 of the sleeve seat 46 and is confined by the head portion 47, thereby preventing deflection of the same. In addition, by means of the clearance 821, an unclamped force applied on the head portion 47 to move the actuating member 42 forwardly, will not impact the third bearing 53.

Figure 7:
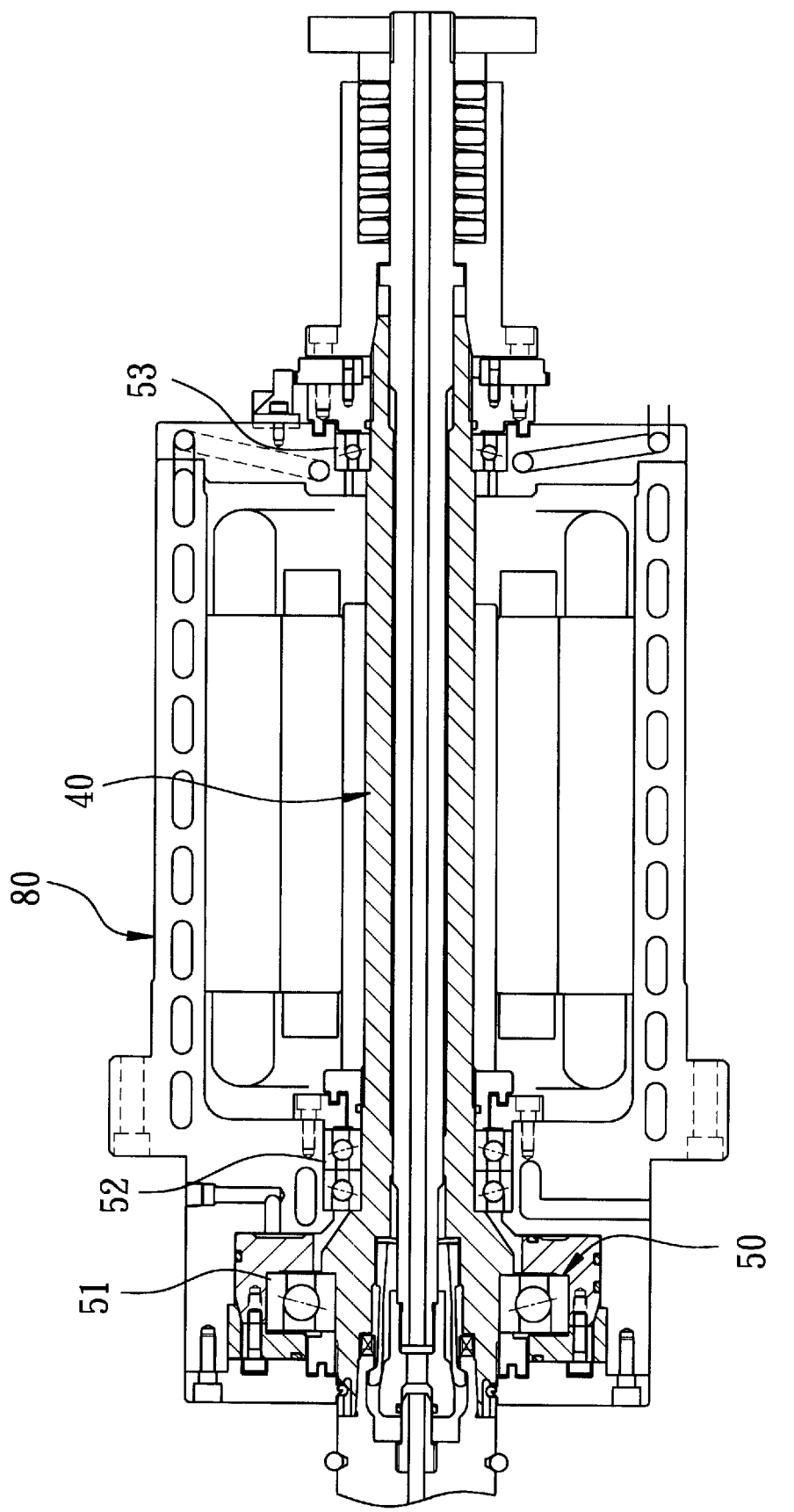
FIGS. 7, 8 and 9 are sectional views of second, third, and fourth preferred embodiments of the spindle head portion of the machine tool according to this invention, respectively.
Figure 8:
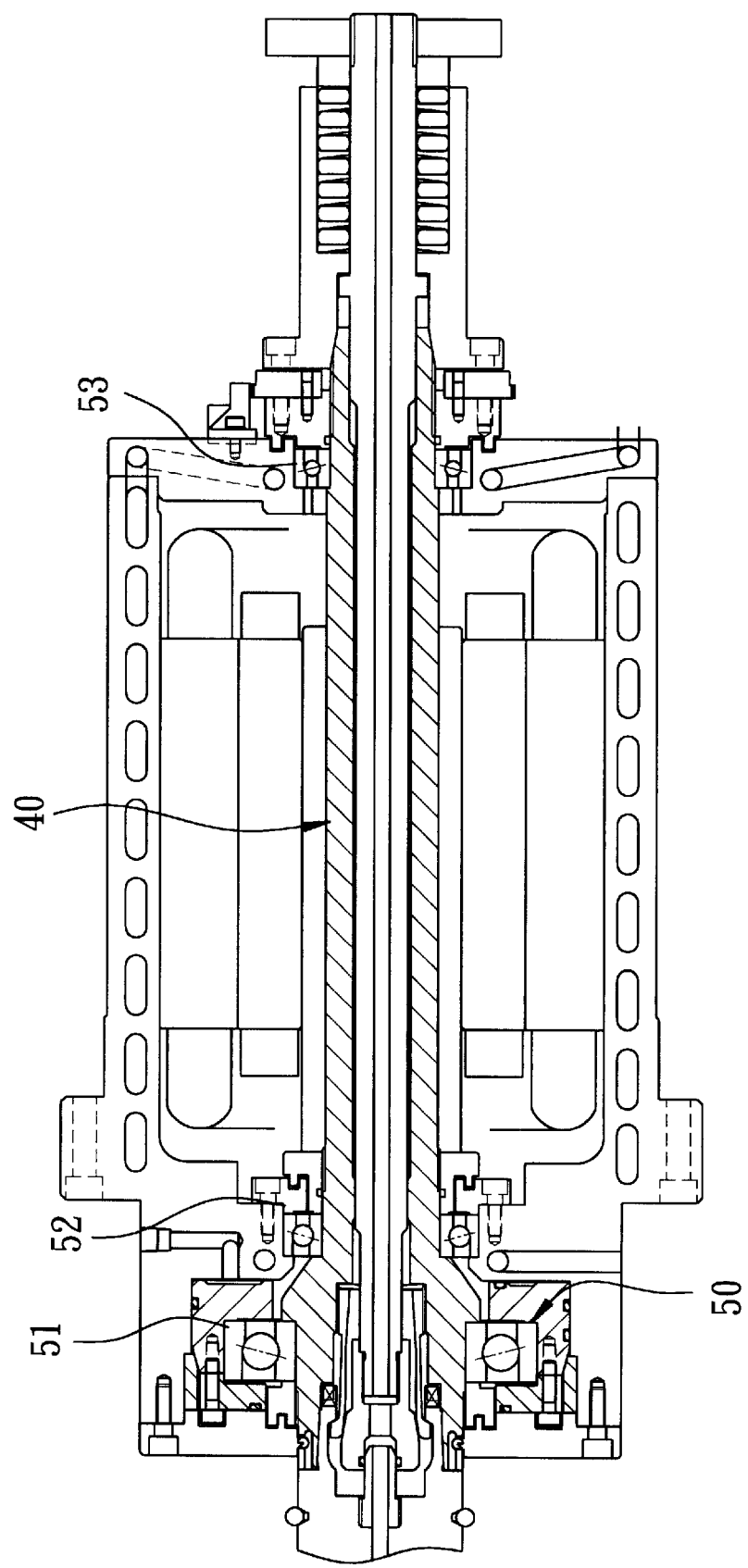
Figure 9:
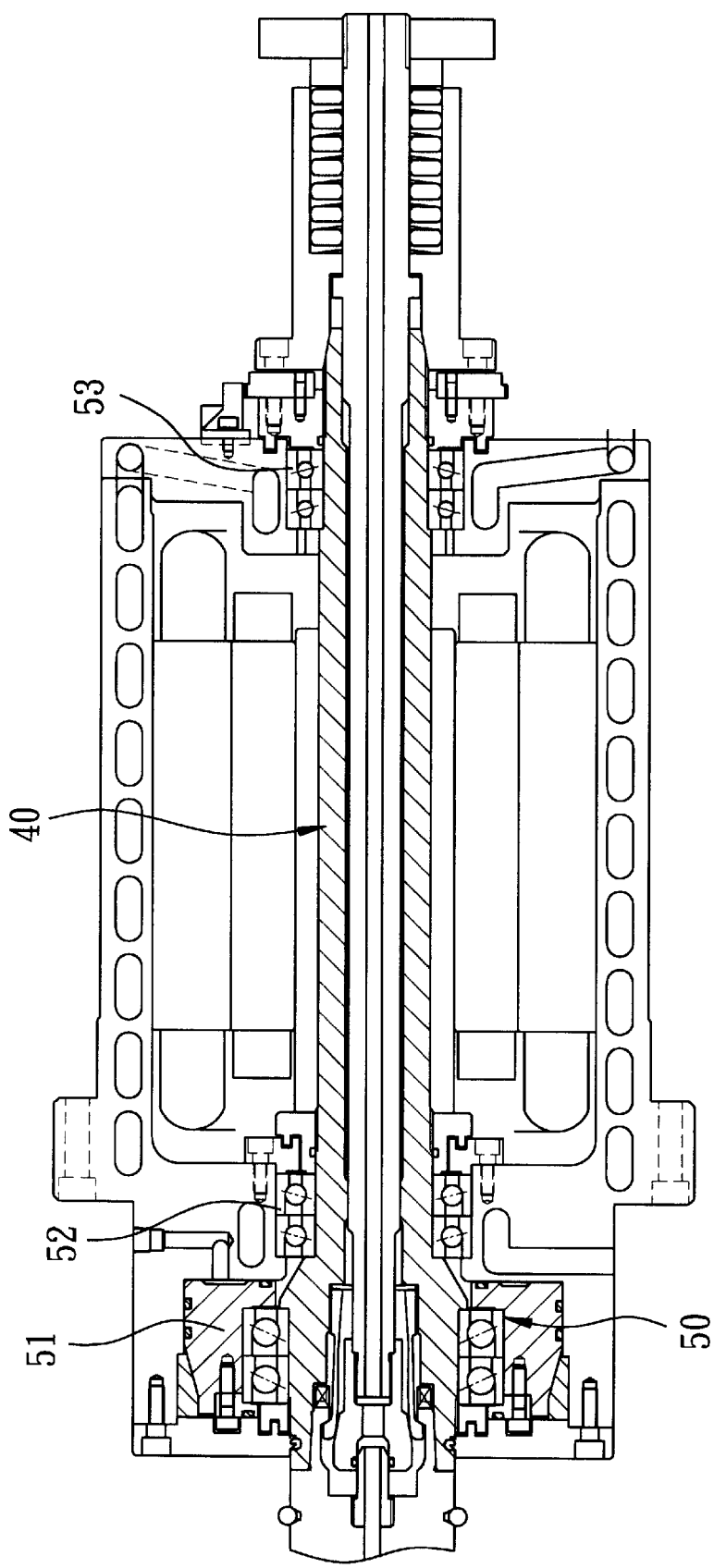

The numbers and the assembling manner of the bearings of the spindle bearing assembly 50 can be varied. As shown in FIG. 1, in this embodiment, the spindle bearing assembly 50 includes two first anti-friction bearings 52, two second anti-friction bearings 51, and two third bearings 53. Alternately, as shown in the second preferred embodiment of FIG. 7, the spindle bearing assembly 50 includes two first anti-friction bearings 52, one second anti-friction bearing 51, and one third bearing 53. As shown in the third preferred embodiment of FIG. 8, the spindle bearing assembly 50 includes one first anti-friction bearings 52, one second anti-friction bearing 51, and one third bearing 53. In the fourth preferred embodiment of FIG. 9, the machine tool is similar to the first preferred embodiment in construction, except for the assembling manner of the bearings 51, 52, 53 of the spindle bearing assembly 50.

Figure 10:
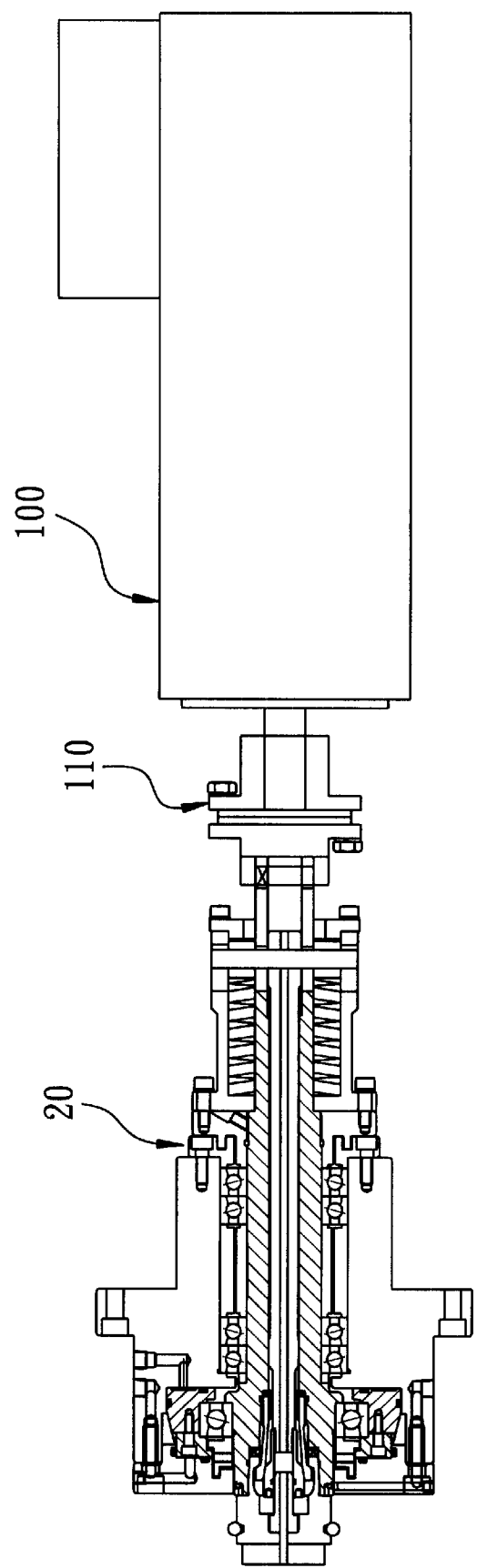
FIG. 10 is a schematic view showing how the spindle head portion is coupled to a transmitting motor via a coupling member.

In the fifth preferred embodiment of FIG. 10, the machine tool includes a transmitting motor 100 which is disposed outwardly and rearwardly of the spindle head portion 20 and which is connected to the spindle head portion 20 by a coupling member 110.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A machine tool comprising:

a housing having an annular inner wall extending in an axial direction, said annular inner wall including a front annular inner wall segment with a first diameter, an intermediate annular inner wall segment with a second diameter which is smaller than said first diameter, and an annular shoulder portion interposed between said front and intermediate annular inner wall segments and extending in a radial direction relative to the axial direction;

a tool spindle mounted in and rotatable relative to said annular inner wall, and including a front spindle segment with a third diameter and disposed to be radially spaced apart from said front annular inner wall segment, an intermediate spindle segment with a fourth diameter which is smaller than the third diameter, and disposed to be radially spaced apart from said intermediate annular inner wall segment, and a rear spindle segment at an opposite side of said intermediate spindle segment relative to said front spindle segment;

a tool member having a clamped portion disposed in said front spindle segment, and a free tool portion extending from said clamped portion axially and outwardly of said front spindle segment;

a clamping member disposed in said front spindle segment to clamp or release said clamped portion;

an actuating member mounted in and axially movable relative to said tool spindle, and including a front actuating end disposed in said front spindle segment to actuate said clamping member to clamp or release said clamped portion when said actuating member is moved axially relative to said tool spindle, and a rear actuated end extending from said front actuating end in the axial direction and rearwardly and outwardly of said rear spindle segment so as to permit external operation of the axial movement of said actuating member;

a first anti-friction bearing interposed between said intermediate annular inner wall segment and said intermediate spindle segment, and has a first outer diameter sufficient to facilitate rotation of said intermediate spindle segment relative to said intermediate annular inner wall segment;

a second anti-friction bearing interposed between said front annular inner wall segment and said front spindle segment, and having a second outer diameter larger than said first outer diameter and sufficient to facilitate rotation of said front spindle segment relative to said front annular inner wall segment; and a preload actuating member disposed to force said second anti-friction bearing in the axial direction to take up the slack in a non-actuated state of said second anti-friction bearing when said tool spindle is running at a higher speed, thereby resuming the anti-friction function of said second anti-friction bearing when running of said tool spindle at a lower rate of speed is intended.

2. The machine tool according to claim 1, wherein said second anti-friction bearing is radially spaced apart from said front annular inner wall segment, and is axially spaced apart from said annular shoulder portion so as to define a cylindrical space, said preload actuating member including a force transmitting member disposed in said cylindrical space and sealingly abutting against said front annular inner wall segment, an inlet disposed in said annular shoulder portion for introducing hydraulic liquid into said cylindrical space so as to move said force transmitting member forwardly to force said second anti-friction bearing in the axial direction, and a resisting member disposed to resist the movement of said force transmitting member in the axial direction caused by introduction of the hydraulic liquid, thereby bouncing said force transmitting member backwards to relieve said second anti-friction member from being forced by said force transmitting member, when the hydraulic liquid is drained out of said cylindrical space.

3. The machine tool according to claim 2, wherein said force transmitting member extends forwardly and is interposed between said front annular inner wall segment and said second anti-friction bearing so as to provide a support for said second anti-friction bearing in the radial direction.

4. The machine tool according to claim 3, wherein said resisting member includes an annular inclined wall formed on said front annular inner wall segment and converged gradually and forwardly in the axial direction, and an annular front converged portion formed on and extending forwardly from said force transmitting member and converged gradually and forwardly so as to matingly abut against said annular inclined wall when said force transmitting member is moved forwardly by the introduction of the hydraulic liquid at said inlet, said force transmitting member being biased to move rearwardly by means of said annular inclined wall once the introduction of the hydraulic liquid at said inlet is stopped.

5. The machine tool according to claim 4, wherein said housing further includes a front end wall disposed in a direction transverse to the axial direction and forwardly of said cylindrical space and opposed to said annular shoulder portion, said front end wall having a front inlet formed therein for introducing another hydraulic liquid to resist the movement of said force transmitting member so as to assist backward bouncing of said force transmitting member.

6. The machine tool according to claim 5, wherein said annular inner wall of said housing further includes a rear annular inner wall segment disposed at an opposite side of said intermediate annular inner wall segment relative to said front annular inner wall segment, said rear annular inner wall segment being radially spaced apart from said rear spindle segment to define a bearing accommodating space therebetween, said machine tool further comprising a third bearing received in said bearing accommodating space and loosely mounted on said rear spindle segment so as to permit adjustment of position of said third bearing relative to said rear spindle segment in the axial direction.

7. The machine tool according to claim 6, wherein said housing further includes a rear end wall extending in the transverse direction and rearwardly of said rear annular inner wall segment, said machine tool further comprising an annular positioning member secured to said rear end wall and including an insert portion extending towards said third bearing and inserted in said bearing accommodating space so as to retain said third bearing in said bearing accommodating space.

8. The machine tool according to claim 7, wherein said insert portion of said annular positioning member is spaced apart from said third bearing in the axial direction to define a clearance therebetween for accommodating an increment of length caused by possible thermal expansion of said tool spindle.

9. The machine tool according to claim 7, further comprising an annular sleeve seat secured on and extending rearwardly of said positioning member, said rear actuated end of said actuating member extending rearwardly of said sleeve seat to form an actuated head which is spaced apart from said sleeve seat in the axial direction, said sleeve seat being spaced radially apart from said rear actuated end to confine an annular recess, and having a compression spring mounted in said annular recess and extending in the axial direction so as to bias said actuated head away from said sleeve seat.

10. The machine tool according to claim 1, wherein said clamping member is of an integrally formed structure.

* * * * *